INVENTOR.
Marvin Walton

United States Patent Office 3,176,746
Patented Apr. 6, 1965

3,176,746
SELF-HOLDING SCREW MEMBER
Marvin Walton, 134 Tuscaloosa Ave., Atherton, Calif.
Filed Apr. 1, 1963, Ser. No. 269,663
1 Claim. (Cl. 151—22)

The present invention concerns itself with a problem peculiar to screws. When screws are employed to connect two articles, or attach one article to another, they tend to work themselves loose in time, no matter how tightly they may be drawn initially. Thus they fail in their intended purpose, especially when the connected articles are subjected to shocks and vibrations. Various methods have been tried in the past to overcome this undesirable tendency, all of which involve the use of additional components, such as spring washers or rubber grommets that are interposed between the head or the nut of the screw and the adjacent article and which are intended to pull the threads of the screw so firmly against the threads of a tapped hole or the threads in the nuts as to prevent relative rotary movement between the screw bolt and the nut or the tapped article. Such additional components and the operations necessary for their application mean a significant increase in cost in an area where cheapness is a most important consideration.

It is an object of my invention to provide a self-holding screw member.

More particularly, it is an object of my invention to provide a screw member that once applied will dependably remain in position without the application of separate rotation-inhibiting components.

Yet another object of my invention is to provide a screw member which is self-holding once it has been applied and which may yet be readily retrieved from a tapped hole in the ordinary manner, if so desired.

These and other objects of the present invention will be apparent from the following description of the accompanying drawing which illustrates certain preferred embodiments thereof, and wherein.

In accordance with my invention I provide the crest of the helical thread of a screw member at intervals with lateral rises or dents that reach to a limited extent into the grooves or valleys between adjacent convolutions of the helical crest. When a screw bolt constructed in this manner is driven into a tapped hole, or a threaded nut is engaged over said screw, these rises jam the screw into position against the adjacent threads of the engaged hole or nut and thus resist effectively any incremental unwinding of the screw within a hole or nut due to shocks or vibrations to which structures connected by said screw may be subjected. A similar effect is obtained when the threads of a nut or tapped hole are constructed in this manner.

Figures 1, 3:
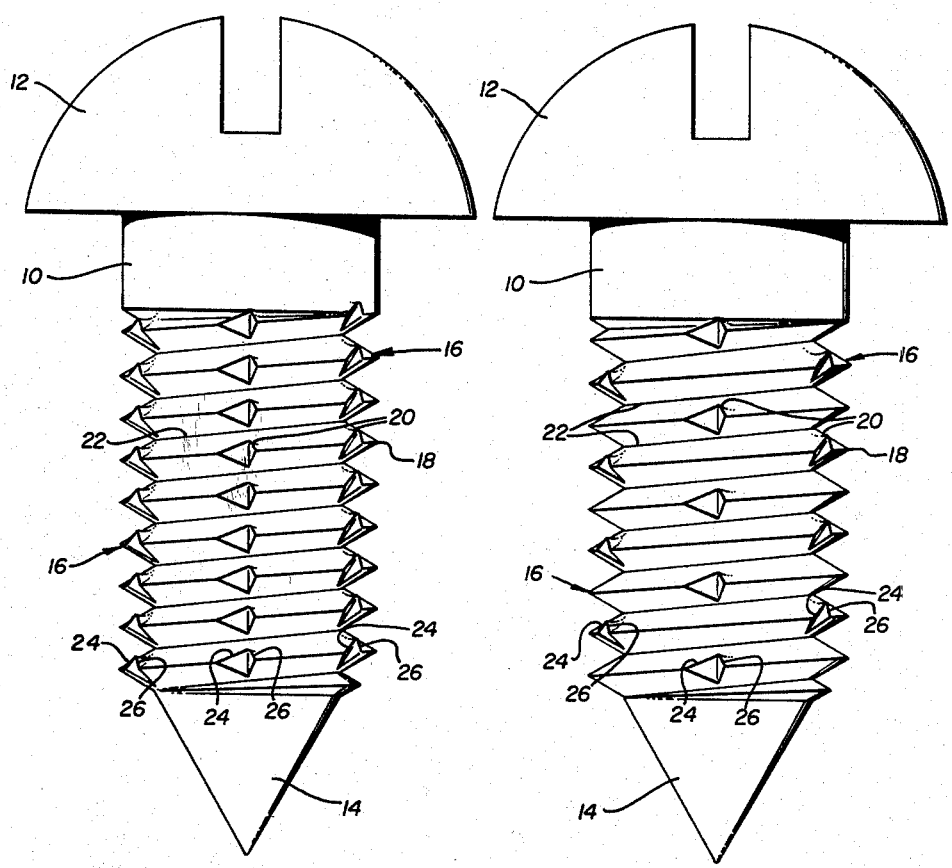
FIGURE 1 is an enlarged fragmentary side elevation of a screw embodying my invention.
FIGURE 3 is a side elevation, similar to FIGURE 1, illustrating a modified embodiment of the invention.

The self-holding screw member illustrated in FIGURE 1, comprises a stem or bolt 10 which carries a head 12 of conventional design and which has a pointed bottom end 14. The stem 10 is provided with a helical thread 16 which descends in a clockwise direction as viewed from the top, from an area near the head 12 to the pointed end 14 of the stem. Formed into the crest 18 of the thread at angularly spaced points thereof are laterally directed undulations or dents 20 which project to a limited extent into the grooves or valleys 22 between adjacent convolutions of the helical crest and extend generally radially inwardly toward the axis of the screw. Each of said dents forms two substantially triangularly shaped surfaces which define leading and trailing ends of the dent and which intersect on a line that extends radially inwardly of the crest of the thread. The leading end of each dent forms a raised portion on the flank of the thread which faces the head of the screw and said raised portion extends gradually upwardly and inwardly with respect to the crest of the thread, and the trailing end of each dent forms a continuation of said raised portion which extends downwardly and outwardly with respect to the crest of the thread at a more abrupt angle than that of the raised portion at the leading end.

The number of dents in the crest of the thread may vary. In the embodiment of the invention illustrated in FIGURE 1, each convolution of the helical crest of the thread exhibits five such dents, and the dents in the superposed convolutions of the helical crest are aligned in the direction of the axis of the screw stem. Alternatively, the dents in the helical ridge of the screw may be arranged in the staggered pattern illustrated in FIGURE 3. The embodiment of the invention illustrated in FIGURE 1 has the advantage that all the aligned dents may readily be produced in a single operation by an appropriately directed stroke of a bar-shaped forming tool against the sides of a conventional screw stem.

Figure 2:
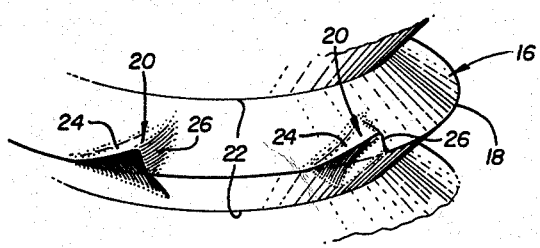
FIGURE 2 is an enlarged fragmentary perspective of some of the threads of the screw illustrated in FIGURE 1.

When the screw of my invention, illustrated on the accompanying drawing, is driven into a tapped aperture or engaged within a threaded nut, it is turned in a clockwise direction in the usual manner. This may require somewhat greater force than is ordinarily the case, but when the screw has reached its proper position and the driving tool is disengaged therefrom, it will dependably remain in place without the use of spring washers or rubber grommets, because the dents 20 in the crest of its thread will engage, and bear against, the threads in the tapped hole or nut, as shown in FIGURE 2, and jam the screw in its position, and especially the steep rear slopes 26 of said dents will act somewhat in the manner of barbs and oppose creeping rotation of the screw in a counterclockwise direction in response to shocks or vibrations. On the other hand, if sufficient force is applied to the screw by a proper driving tool in a counterclockwise direction, it is readily possible to withdraw the screw from the tapped hole, or remove the nut from its end.

Figure 4:
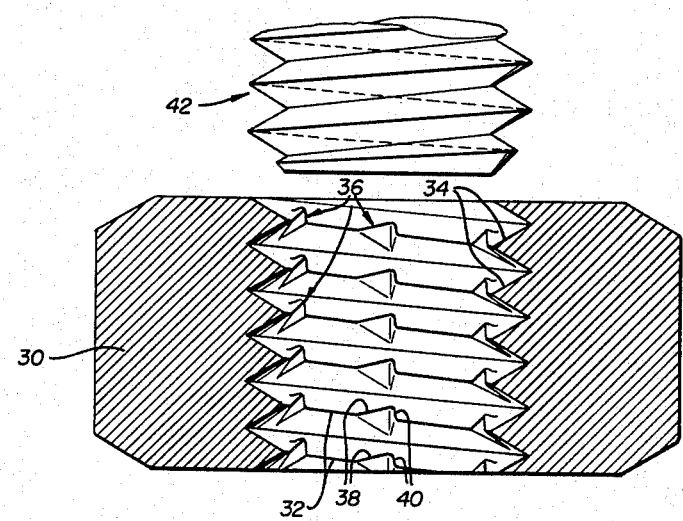
FIGURE 4 is a vertical section through a nut whose threads are constructed in accordance with my invention.
Figure 5:
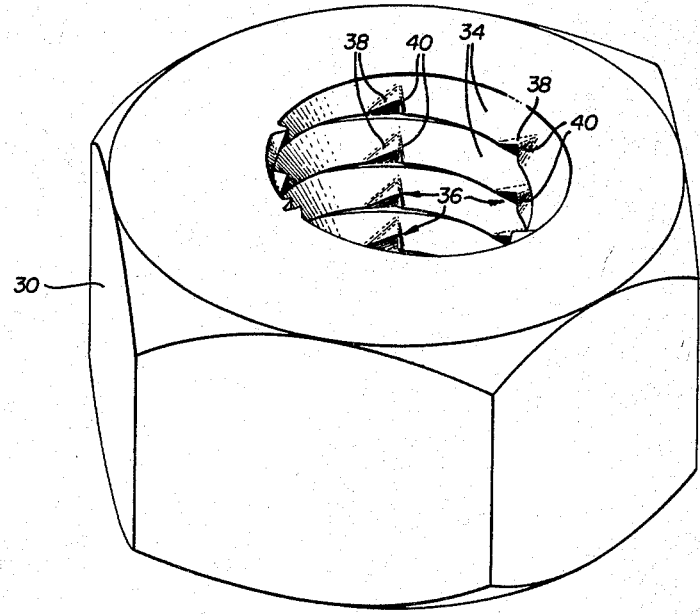
FIGURE 5 is a perspective of the nut shown in FIGURE 4.

FIGURES 4 and 5 illustrate the manner in which the principles of my invention may be applied to a nut 30 or any other article or member having a tapped hole. As shown in said figures, the crest 32 of the internal helical thread 34 of nut 30 is provided with laterally directed dents or rises 36 at angularly spaced intervals. On the side which faces the direction of rotation in which the nut is to be applied to a screw, said dents or rises 36 form a gently ascending slope or ramp 38 and on the opposite side they form a relatively steep drop 40. When the nut 30 has been applied to a conventional screw such as the screw bolt indicated at 42 in FIGURE 4 said rises will effectively resist any tendency of the nut to unwind itself from the screw, in spite of shocks and vibrations to which the assembly may be subjected.

While I have described my invention with the aid of certain preferred embodiments, thereof, it will be understood that the invention is not limited to the specific constructional details shown and described by way of example which may be departed from, without departing from the scope and spirit of the invention. Thus, lateral rises or dents may be formed on both sides of the helical ridge of the screws but may only be formed on alternate ones of the superposed convolutions thereof.

I claim:

A self-holding screw member comprising a helically descending thread having a crest containing at angularly spaced points along its total length laterally directed dents extending generally radially inwardly toward the axis of the screw, each of said dents comprising two substantially triangularly shaped surfaces defining leading and trailing ends thereof and intersecting on a line radially inwardly the crest of said thread, the leading end of each dent forming a raised portion on the flank of the thread facing an end of the screw member, said raised portion extending gradually upwardly and inwardly with respect to said crest, and the trailing end of each dent forming a continuation of said raised portion wherein said continuation extends downwardly and outwardly with respect to said crest at a more acute angle than that of the raised portion at the leading end.

References Cited by the Examiner

UNITED STATES PATENTS

| 1,957,095 | 5/34 | Cole | 151—22 |
| 2,135,637 | 11/38 | Gade | 151—22 |
| 2,177,004 | 10/39 | Purtell | 151—22 |

FOREIGN PATENTS

| 975,103 | 10/50 | France. |
| 1,104,782 | 6/55 | France. |
| 11,334 | 7/90 | Great Britain. |

EDWARD C. ALLEN, *Primary Examiner.*